(No Model.)
H. D. RISLEY.
TWINE ADJUSTER.
No. 305,110. Patented Sept. 16, 1884.
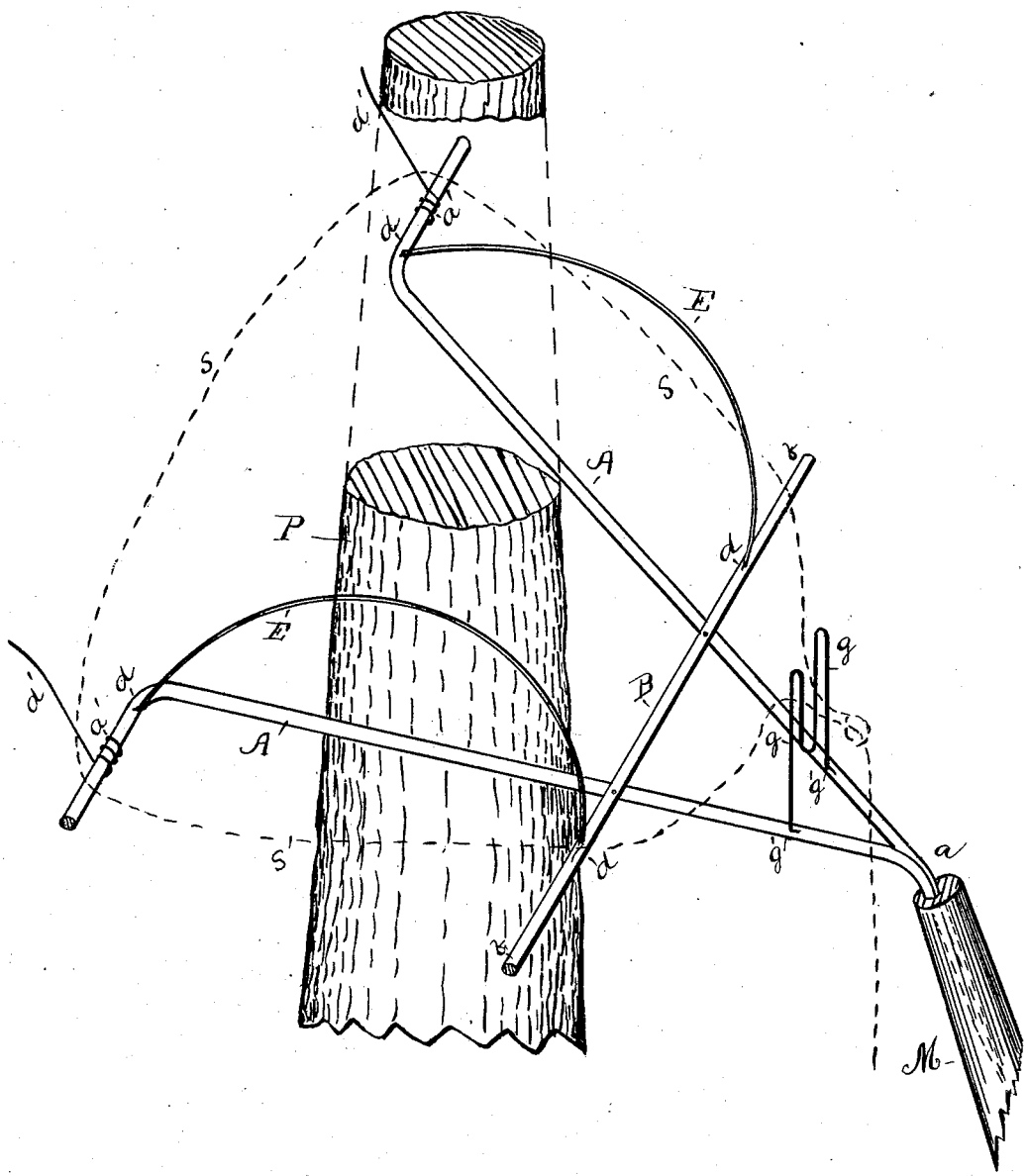
Witnesses
C. F. Clark
Edward D. W. Faites
Inventor
Henry D. Risley
by Risley, Lewis & Perry
his attys in fact

UNITED STATES PATENT OFFICE.

HENRY D. RISLEY, OF MADISON, NEW YORK.

TWINE-ADJUSTER.

SPECIFICATION forming part of Letters Patent No. 305,110, dated September 16, 1884.

Application filed May 12, 1884. (No model.)

*To all whom it may concern:*

Be it known that I, HENRY D. RISLEY, a resident of the town of Madison, in Madison county, and State of New York, and a citizen of the United States, have invented a new and useful Improvement in a Twine-Adjuster; and I do hereby declare the following to be a full, clear, and exact description of the same, reference being had to the accompanying drawing, and to the letters and figures marked thereon.

My invention relates to an improved machine for tying or fastening twine to an elevated portion of a hop or bean pole by the operator while standing on the ground, and is more particularly described hereinafter.

The figure represents a perspective view of my improved machine, the same in position to be elevated, with the twine on the guides and supports ready to be elevated to attach same to the pole.

Having described my invention by reference to the figure in the accompanying drawing, I will now proceed to describe it by reference to the letters marked thereon, in which similar letters refer to corresponding parts throughout the several views.

A A represent triangular wires or bars made of ordinary iron or steel, or any other suitable material, welded, pressed, or fastened together at the shank $a$, and inserted in handle M, of the required length to elevate the twine to the required height. These extension-arms have an outward projection, $a'$ $a'$, two or more inches in length, on which the twine rests.

B represents a cross-support placed on the surface of angle-arms A A, about one-third the distance from the handle, with projecting ends $b$ $b$. These extension-arms $b$ $b$ are provided as supports to keep the twine in proper position for being tightened at the top of the pole.

E E represent two circular guides formed of iron or steel-wire or other suitable material. One end of each wire is inserted at the outward-projecting angle of arms A A. The other ends are inserted in cross-bar B in the projecting surfaces of bar $b$. This, however, may be changed, so as to insert rear end of the guides in rods A A, without interfering with the usefulness of my invention. I, however, prefer that they should be inserted in cross-bar B outside of rods A A. By this means the twine is kept from coming in contact with the pole while being elevated on the pole. $d$ $d$ $d$ $d$ represent the points where the ends of these guides are inserted in the cross and angle bars.

$d'$ $d'$ represent the guides, made of coiled wire, formed over the projecting angle of the arms $a'$ $a'$, projecting upward, with a slight outward bend at the top, about two inches in length. It is obvious that the same result may be accomplished by one or more adjustable spring-guides without interfering with the usefulness of my invention. I, however, prefer two.

$g$ $g$ represent a U-shaped guide rigidly attached to angle-arms A A a short distance from the end of the handle at $g'$ $g'$, as illustrated in the accompanying drawing.

S represents the twine ready to be elevated on a pole.

Mode of operation: The pole to which twine is to be tied is placed in the opening between arms A A. The twine is then placed around the pole outside of guides $d'$ $d'$ and circular guides E E, and tied in a slipping knot, and the twine is then placed between guides $g$ $g$, and the twine-adjuster is then elevated to the required height. When the operator draws the twine, the adjustable guides $d'$ $d'$ move backward, and the twine slips from the guides E E, thereby allowing the twine to embrace the pole at the required elevation.

P represents the pole, to which the twine is attached, and S represents the twine in position on the machine, ready to be elevated to the required height.

In twining or stringing hops the operator usually attaches the twine to the pole at the required elevation by standing on a ladder. By the use of my improved machine the operator can attach the twine to the pole at any required elevation by placing my improved machine against a pole, with the extension-arms embracing the same, by passing a twine around the movable and stationary guides and tying a slipping knot, and then elevating the twine-adjuster to the desired height, and then pulling on the twine, thereby releasing the same from the adjustable and stationary guide. This can be accomplished with rapidity.

It is obvious that the form of mechanism may be changed to a variety of shapes without interfering with the usefulness of my invention.

What I claim as new, and desire to secure by Letters Patent, is—

The herein-described twine-adjuster, having one or more vertical spring-guides adapted to hold and discharge the twine from the same, in combination with extension-arms and stationary guides, as described.

HENRY D. RISLEY.

Witnesses:
C. W. STAPLETON,
B. W. MINER.